United States Patent
Qi et al.

(10) Patent No.: US 9,204,388 B2
(45) Date of Patent: Dec. 1, 2015

(54) LAYER-1 SIGNALING OF TRAFFIC INDICATION FOR POWER SAVING CLASS OF TYPE I IN WIMAX

(75) Inventors: Xin Qi, Beijing (CN); Zexian Li, Espoo (FI); Antonio Marzia, Ponsacco (IT)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1517 days.

(21) Appl. No.: 12/290,935

(22) Filed: Nov. 5, 2008

(65) Prior Publication Data

US 2009/0135755 A1    May 28, 2009

Related U.S. Application Data

(60) Provisional application No. 61/002,105, filed on Nov. 5, 2007.

(51) Int. Cl.
*G08C 17/02* (2006.01)
*H04W 52/02* (2009.01)
*H04W 76/04* (2009.01)

(52) U.S. Cl.
CPC ...... *H04W 52/0216* (2013.01); *H04W 52/0229* (2013.01); *H04W 76/04* (2013.01); *Y02B 60/50* (2013.01)

(58) Field of Classification Search
USPC ......................................... 370/311, 228, 477
See application file for complete search history.

(56) References Cited

U.S. PATENT DOCUMENTS

2006/0029011 A1*  2/2006  Etemad et al. ............... 370/311
2006/0203766 A1*  9/2006  Kim et al. .................... 370/328

FOREIGN PATENT DOCUMENTS

WO    WO-2006/039812 A1    4/2006

OTHER PUBLICATIONS

M. Cudak, "Draft IEEE 802.16m Requirements", IEEE 802.16m-07/002r3, dated Aug. 13, 2007.
M. Cudak "IEEE 802.16m System Requirements" IEEE 802.16m-07/002r4, dated Oct. 19, 2007.

* cited by examiner

*Primary Examiner* — Donald Mills
*Assistant Examiner* — Henry Baron
(74) *Attorney, Agent, or Firm* — Core Wireless Licensing (57) ABSTRACT

Disclosed herein are apparatus, method, and computer program whereby a mobile station receives an indication from a base station in a physical layer field and interprets the indication for use in at least a power management function.

24 Claims, 6 Drawing Sheets

FIG.1

TABLE 1

| SYNTAX | SIZE | NOTES |
|---|---|---|
| Wakeup_indication field { | | |
| if (flag=01 ‖ flag=10) { | | |
| wakeup bitmap | 32 bits | The MSs belonging to the groups whose corresponding bit in this bit-map are set shall start to decode detailed bitmaps of the corresponding group |
| } | | |
| else if (flag=11) { | | |
| SPLID I | 10 bits | The 1st SLPID related to the power saving class(es) deactivated by this message and to the MS to be transited into an awake mode |
| SPLID II | 10 bits | The 2nd SLPID |
| SPLID III | 10 bits | The 3rd SLPID |
| RSV | 2 bits | Reserved bits |
| } | | |
| DCD | 4 bits | |
| UCD | 4 bits | |
| CRC | 8 bits | 8-bit checksum, defined same as the checksum for generic MAC header |
| } | | |

FIG.2

TABLE 2

| SYNTAX | SIZE | NOTES |
|---|---|---|
| Detailed bitmap field {<br>for (i=0; i<M; i++) {<br>detailed bitmap<br>}| 32 bits | |
| CRC<br>} | 8 bits | 8-bit checksum, defined same as the checksum for generic MAC header |

FIG.3

TABLE 3

| NAME | SIZE | NOTES |
|---|---|---|
| Format_Flag | 2 bits | Two bits used to indicate the format of the "wakeup_indication" field |
| Location_Flag | 1 bit | One bit used to indicate the location of the "wakeup_indication" field<br>'0': The "wakeup_indication" field is located immediately after the end of the DL-MAP<br>'1': The "wakeup_indication" field is located immediately after the FCH and before the start of the DL-MAP |

LAYER-1 SIGNALING OF TRAFFIC INDICATION FOR POWER SAVING CLASS OF TYPE I IN WIMAX

CROSS-REFERENCE TO RELATED APPLICATIONS

This patent application claims priority under 35 U.S.C. §119(e) from U.S. Provisional Patent Application No. 61/002,105, filed Nov. 5, 2007, the disclosure of which is incorporated by reference herein in its entirety.

TECHNICAL FIELD

The exemplary and non-limiting embodiments of this invention relate generally to wireless communication systems, methods, devices and computer program products and, more specifically, relate to techniques to provide power savings in mobile, battery powered user communication equipment.

BACKGROUND

Various abbreviations that appear in the specification and/or in the drawing figures are defined as follows:
BCH broadcast channel
BS base station
BSID base station identification
CID connection identifier
DCD downlink channel descriptor
DL downlink (BS to MS)
FCH frame control header
FMT format
MAC medium access control layer
MAP map messages corresponding to DL or UL
MCS modulation coding scheme
MS mobile station
MSDU medium access control layer service data unit
PHY physical layer
PSC power saving class
PSCID power saving class ID
RSV reserved
SLPID sleeping ID
SFH superframe header
UCD uplink channel descriptor
UL uplink (MS to BS)
WiMAX worldwide interoperability for microwave access The IEEE 802.16 working group has established a new task group, 802.16m, to provide an advanced air interface to meet the IMT-Advanced requirement, and which amends IEEE 802.16-2004 (see IEEE 802.16-2004, "IEEE Standard for Local and Metropolitan Area Networks—Part 16: Air Interface for Fixed Broadband Wireless Access Systems," Jun. 24, 2004) and 802.16e (see IEEE 802.16e-2005, "IEEE Standard for Local and Metropolitan Area Networks—Part 16: Air Interface for Fixed and Mobile Broadband Wireless Access Systems," Feb. 28, 2006) in order to meet the requirements of next generation mobile networks. One target of the 802.16m specification work is to provide support for enhanced power saving functionality to help reduce power consumption in devices for all services and applications (see IEEE 802.16m System Requirements, 2007-10-19).

In WiMAX, the sleep mode is intended to minimize MS power usage and decrease usage of serving BS air interface resources. For each involved MS, the BS maintains one or several contexts, each one related to certain PSC. The PSC is a group of connections that have common demand properties.

There are currently three types of PSC, which differ by their parameter sets, procedures of activation/deactivation, and policies of MS availability for data transmission.

The PSC of type I is recommended for connections of best-effort, none-real-time type of services. The PSC of type I is deactivated either by a MOB_SLP-REQ/"BR and UL sleep control header", or by MOB_SLP-RSP/DL sleep control extended subheader messages, or (if a traffic triggered wakening flag=1) after one of following events: the BS transmits (during availability window) a MSDU or fragment thereof over a connection belonging to the power saving class; the MS transmits a bandwidth request with respect to a connection belonging to the power saving class; or the MS receives a MOB_TRF-IND message indicating a presence of buffered traffic addressed to the MS. If the traffic-triggered wakening flag=0, the PSC of type I will not be deactivated, even if there are data packets transmitted to/from MSs during a listening window.

When the PSC of type I is activated, during the listening window, the MS is expected to receive all DL transmissions in the same manner as in a state of normal operations (i.e., no sleep mode activated). This means that DL-MAP/UL-MAP messages are to be received and decoded by the MS, even if MS does not need to know all the details of these messages. Note that DL-MAP/UL-MAP messages normally consume more than 10% of a frame's resources, which is a significant portion. Thus, the power of the MS is needlessly consumed for a case where the MS does not need to wake up due to an absence of a DCD/UCD change or an absence of buffered DL traffic.

MOB_SLP-REQ, MOB_SLP-RSP and MOB_TRF-IND from 6.3.2.3.44, 6.3.2.3.45 and 6.3.2.3.46 of IEEE 802.16e, respectively are described below.

A MS with a supporting sleep mode uses the MOB_SLP-REQ message to request definition and/or activation of certain PSC of types 1, 2, and 3. The MOB_SLP-REQ message is sent from the MS to the BS on the MS's basic CID. If the definition bit is set, the message contains a new PSC suggested by the MS A MS with a supporting sleep mode will receive the MOB_SLP-RSP message. The MOB_SLP-RSP message is sent from a BS to a MS on broadcast CID or on the MS' basic CID in response to an MOB_SLP-REQ message. The MOB_SLP-REQ message may also be sent unsolicited. If a definition bit is set, the message contains the definition of a new PSC together with an assigned PSCID. The PSCID that is unique for every MS if only unicast traffic connections are included and unique for every cell if only multicast connections are included. A mixture of multicast and unicast connections in a single class is not allowed.

Upon reception of the message, the MS assembles connections in PSCs and optionally activates them as requested in the message. If certain class activations are deferred (Activation=0), the BS may signal activation at a later time in another unsolicited MOB_SLP-RSP message.

Also of note is the MOB_TRF-IND message. This message is sent from a BS to a MS on broadcast CID or sleep mode multicast CID. The message is intended for MSs that are in sleep mode that have one or more PSCIDs of type I, and is sent during those MS's listening-intervals. Any MS without PSCIDs of type I ignore this message. The message indicates whether there has been traffic addressed to each MS that is in sleep mode. For a MS that is in sleep mode, during its listening-window the MS decodes this message to seek an indication addressed to itself.

When the MS awakens, it will check the frame number to ensure that it did not lose frame synchronization with the BS and read the SLPID-Group Indication bit-map or Traffic Indication bit-map assigned to it and decide whether to continue in sleep mode or return to normal operation.

There are two formats for the MOB_TRF-IND message, indicated by the FMT field. When FMT=0, if the MS does not find its own SLPID-Group Indication bit-map or traffic indication bit-map corresponding to its SLPID in the MOB_TRF-IND message, it will consider this as a negative indication and may continue in sleep mode. When FMT=1, if the MS does not find its own corresponding SLPID in the MOB-TRF-IND message, it will consider this as a negative indication and may continue in sleep mode.

The BS may arbitrarily include a positive indication for a MS in the MOB_TRF-IND message during the listening-window. This may occur if the MS's periodic ranging operation is scheduled to start sooner or later within the next sleep-window and there is no DL traffic to be sent to the MS.

SUMMARY

A first embodiment of the invention is a method comprising: receiving an indication from a base station in a physical layer field; and interpreting the indication for use in at least a power management function.

Another embodiment of the invention is a method comprising: determining that a mobile station does not need to receive and decode a downlink transmission; and transmitting an indication to the mobile station, where the indication is transmitted from a physical layer field.

A further embodiment of the invention is a computer readable medium encoded with a computer program executable by a processor to perform actions comprising: receiving an indication from a base station in a physical layer field; and interpreting the indication for use in at least a power management function.

A still further embodiment of the invention is a computer readable medium encoded with a computer program executable by a processor to perform actions comprising: determining that a mobile station does not need to receive and decode a downlink transmission; and transmitting an indication to the mobile station, where the indication is transmitted from a physical layer field.

Another further embodiment of the invention is an apparatus, comprising: a receiver configured to receive an indication from a base station in a physical layer field; and a controller configured to interpret the wakeup-indication field for use in at least a power management function.

Another further embodiment of the invention is an apparatus, comprising: a controller configured to determine that a mobile station does not need to receive and a decode downlink transmission; and a transmitter configured to send an indication to the mobile station, where the indication is transmitted in a physical layer field.

DETAILED DESCRIPTION

The exemplary embodiments of this invention overcome the foregoing and other problems by moving the "MOB_TRF-IND" message and DCD/UCD information from MAC messages (Layer 2). The MS determines whether to start to decode MAP messages according to this (moved) information. In this way, unnecessary power consumption for decoding the DL/UL-MAP messages is avoided. To accomplish this, a "wakeup_indication" field is defined in the PHY (Layer 1) with fixed length of, for example, 48 bits. A MS with a connection of PSC type I decodes the wakeup_indication field when it is in a listening window.

Figure 1:
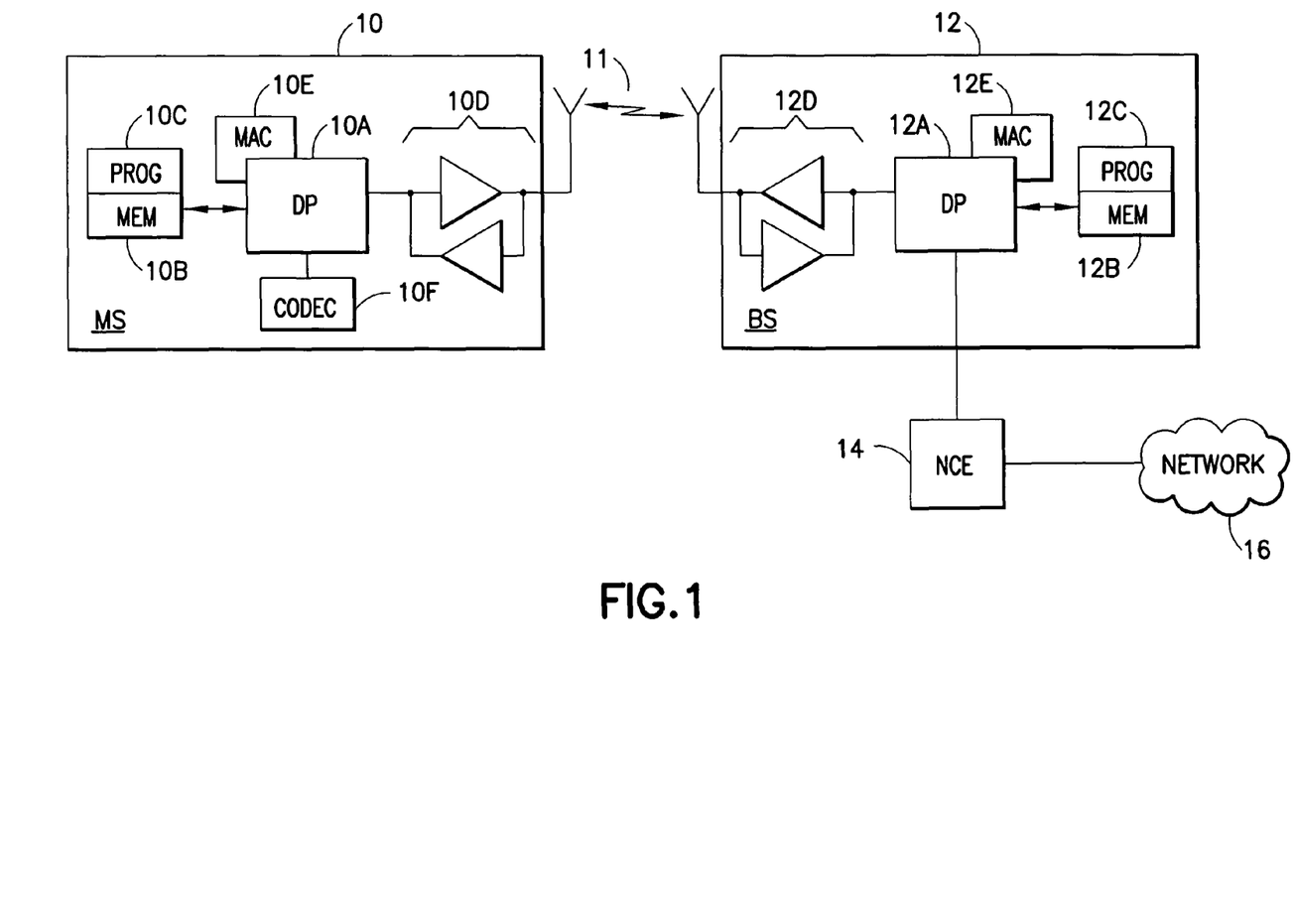
FIG. 1 shows a simplified block diagram of various electronic devices that are suitable for use in practicing the exemplary embodiments of this invention.

These and other aspects of the exemplary embodiments are discussed in detail below. However, reference is first made to FIG. 1 for illustrating a simplified block diagram of various electronic devices that are suitable for use in practicing the exemplary embodiments of this invention. In FIG. 1 a wireless system 1 is adapted for communication with at least one MS 10 via a BS 12, although in a typical implementation there will be a plurality of MSs 10 that are served by the BS 12. The system 1 may include a network control element (NCE) 14 and, in general, may be compatible with IEEE 802-16 or similar protocols. An external network 16, such as the Internet, may be coupled to the system 1 via the NCE 14 or directly through the BS 12, depending on the specifics of the system implementation. The MS 10 includes a data processor (DP) 10A, a memory (MEM) 10B that stores a program (PROG) 10C, and a suitable radio frequency (RF) transceiver 10D for bidirectional wireless communications with the BS 12 via a wireless link 11. Note that in some implementations there may be one or more relay elements or nodes (not shown) through which the wireless link 11 passes. The BS 12 also includes a DP 12A, a MEM 12B that stores a PROG 12C, and a suitable RF transceiver 12D. The BS 12 may be coupled via a data path 13 to the NCE 14. The PROGs 10C and 12C are assumed to include program instructions that, when executed by the associated DP, enable the electronic device to operate in accordance with the exemplary embodiments of this invention, as will be discussed below in greater detail.

The MS 10 and the BS 12 may both be considered to include a MAC function or controller 10E, 12E, respectively.

In general, the exemplary embodiments of this invention may be implemented at least in part by computer software executable by the DP 1 OA of the MS 10 and by the DP 12A of the BS 12, or by hardware, or by a combination of software and hardware.

In general, the various embodiments of the MS 10 can include, but are not limited to, radio telephones (such as cellular phones), personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor-based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multi-core processor architecture, as non-limiting examples.

Turning now to the description of the exemplary embodiments in accordance with this invention, a description is made first of the wakeup_indication field.

When indicated by the wakeup_indication field, the MS 10 begins to decode MAP-messages, regardless of whether the traffic-triggered wakening flag is set. The deactivation condition of the PSC may be the same as with 802.16e.

At least two formats of the wakeup_indication field may be used (bit-map transmitted and SLPID transmitted), both with DCD/UCD information included.

Bit-Map Transmitted

The bit-map may be defined with a hierarchical structure: Note first that there are 1024 possible SLPIDs defined in current 802.16e. These are separated into 32 groups, where each group has 32 SLPIDs. The 32-bit wakeup bit-map in the wakeup_indication field corresponds to the 32 groups.

The detailed bit-map or second bit-map (defined either in a PHY field after the wakeup_indication field, or as MAC messages) correspond to the groups whose indication bits in the first bit-map are set, and indicate which MS 10 in the group should start to decode the DL-MAP messages in the following frames in the listening window. The location of the detailed bit-map may be in another PHY field or in MAC messages.

Additionally a bit-map transmission may be implemented in a superframe. In reference to FIG. 9 a new basic frame structure that has been accepted by IEEE 802.16m is shown. A 20 ms superframe is divided into four equally-sized 5 ms radio frames. Each 5 ms radio frame further consists of 8 subframes. A subframe is assigned for either DL or UL transmission. Each superframe begins with a DL subframe that contains a SFH. The SFH contains a BCH and other data or control channels. The BCH carries essential system parameters and system configuration information. A MS needs to acquire the information in the BCH to correctly decode the superframe.

Figure 9:
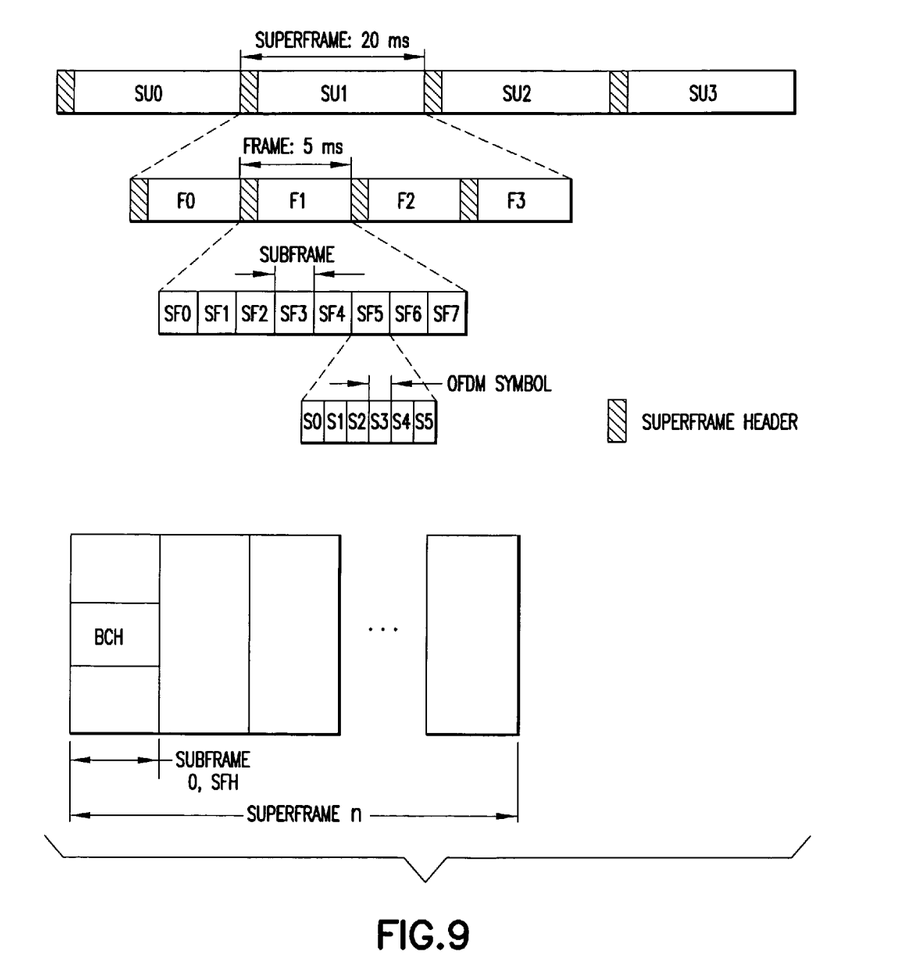
FIG. 9 illustrates a basic frame structure accepted by 802.16m.

For superframe-level implementation, the first bit-map is transmitted either in BCH or in SFH (outside BCH). The second bit-map or the MAC message is transmitted in the same way as described above in the non-superframe level implementation. The first bit-map is a pure bitmap. Each bit indicates whether MSs in a group should wakeup and read the second bit-map (or the MAC message). There is no FCH in the superframe-level implementation. The first bit-map may be a length other than 32 bits.

SLPID Transmitted

Several SLPIDs may be listed in the wakeup_indication field. The corresponding MSs 10 in response begin to decode DL-MAP messages.

The existence of the wakeup_indication field may be indicated by reserved bits in the 802.16e FCH. In this way, backwards compatibility to the selected WiMAX profile according to IEEE 802.16m System Requirements is provided. The MCS level of the field may be the same as with the DL-MAP messages.

Described now is a procedure for the MS 10 to check synchronization with the BS 12.

One aspect of the use of the wakeup_indication field is that when the MS 10 wakes up, it needs to check synchronization with the BS 12. Therefore, the MS 10 needs to decode the BSID and frame number. However, if the MS 10 does not decode the DL-MAP it does not have this information.

Further in accordance with the exemplary embodiments of this invention, there are at least two approaches to achieving synchronization with the BS 12.

In a first embodiment the MS 10 obtains synchronization by decoding MAP messages.

In this embodiment the listening window may be longer than one frame (e.g., 0~255 frames). In this case the MS 10 may obtain synchronization by the first frame. In the following frame in the listening window the MS 10 does not need to decode the MAP messages.

Note in this respect that a "Multiple-frame" listening window is commonly used when the Traffic_triggered_wakening_flag='0'. In this case, PSCs of type I can only be deactivated through messages (MOB_SLP-REQ/RSP) or DL sleep control extended subheader/UL Sleep control header. For this reason, the listening window should be large enough to permit data transfer.

For the case of a single-frame listening window, a more modest gain is achieved in that the MAC controller 10E of the MS 10 does not need to decode entire MAP messages. This embodiment is backwards compatible.

In a second embodiment all of the related common fields are moved outside of the MAP-message.

In this second embodiment the related fields (48 bits in all) are moved: PHY synchronization fields (32 bits), Operation ID (8 bits), Sector ID (8 bits). Note that the BSID may have the same format as that defined in a compressed MAP message. These moved bits are placed before the wakeup_indication field. In this case the wakeup_indication field becomes a 96-bit field. A MS 10 in the listening window can avoid decoding all of the unrelated MAP messages. Note that while this option is not backwards compatible, it is more efficient than the first embodiment (obtaining synchronization by decoding MAP messages).

Figure 2:
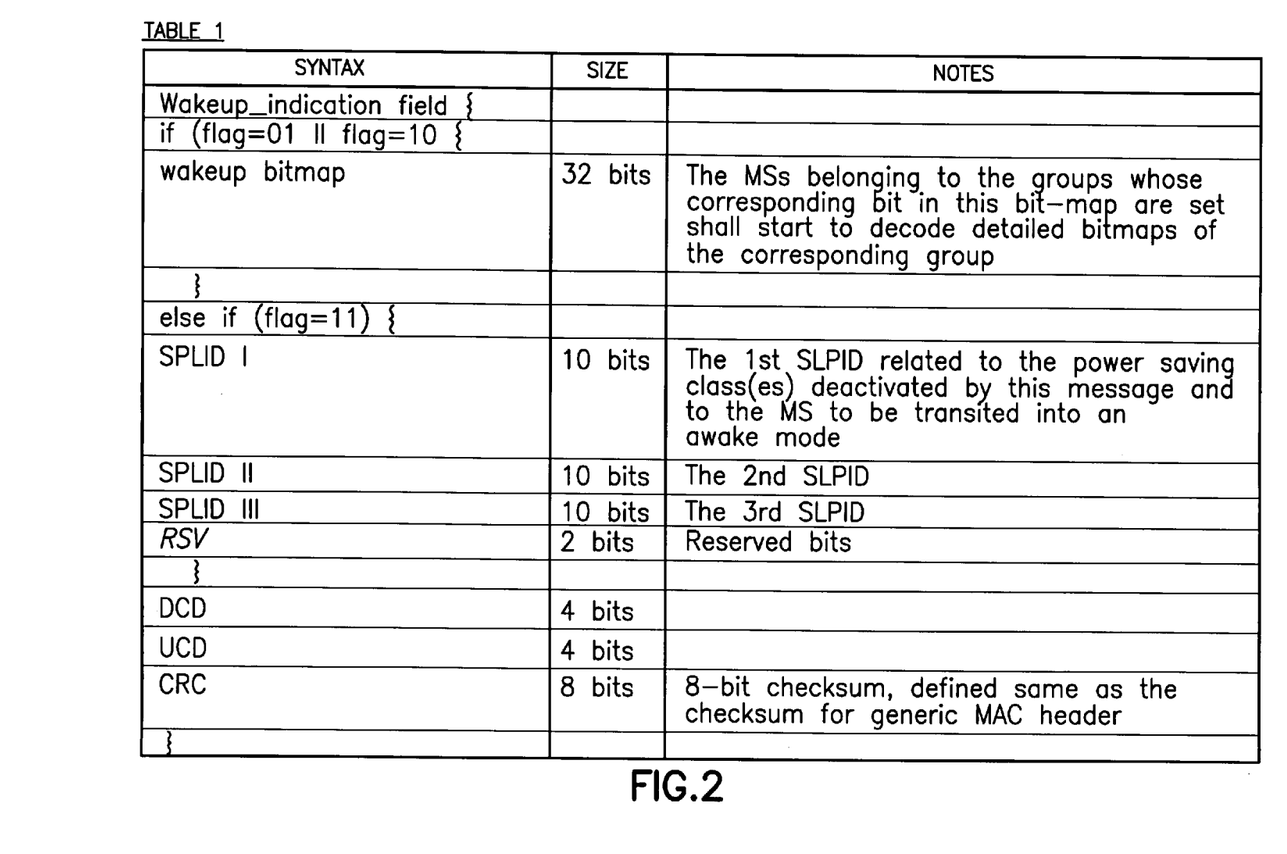
FIG. 2 illustrates a Table (Table 1) showing a (non-limiting) implementation example of a wakeup_indication field in accordance with the exemplary embodiments of this invention.

In the following discussion an implementation example for the 802.16 specifications is given in Table 1 (FIG. 2), where a 2-bit flag (in RSV bits in the FCH) is used to indicate the method. Here it is assumed that the MS 10 becomes synchronized to the BS 12 by the first embodiment discussed above (synchronization by decoding MAP messages). Thus, the DCD/UCD counts are not given in 8 bits. Since the synchronization is checked by decoding MAP messages in the first frame of the listening window, the absolute DCD/UCD count can be known. The MS 10 need only track the change of DCD/UCD in other frames in the listening window. This embodiment may be readily extended to the second synchronization method by adding the related fields to the wakeup_indication field.

When flag=00, the method is not used in the current frame.

When flag=01, those MSs 10 belonging to the groups whose corresponding bit in the wakeup bitmap are set begin to decode the related MAC message in the same frame to find the detailed wakeup bitmap of each group.

Figure 3:
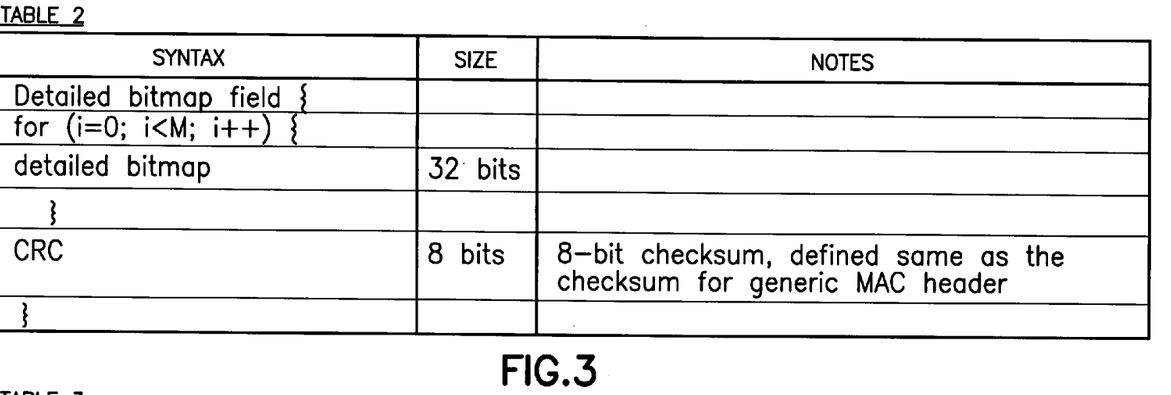
FIG. 3 illustrates a Table (Table 2) showing a non-limiting example of a detailed wakeup bitmap.

When flag=10, those MSs 10 belonging to the groups whose corresponding bit in the wakeup bit-map are set begin to decode another PHY field immediately after the wakeup_indication field in the same frame to find the detailed wakeup bitmap of each group. The structure of the field of detailed wakeup bitmap is defined in Table 2 (FIG. 3).

Note in this regard that the detailed bit-map of each group is also of 32 bits, and that all of the detailed bit-maps can be transmitted in the same field. Note further that the wakeup_indication field and the detailed bitmap field can be encoded separately. Note also that because there are 32*M+8 bits to be transmitted, and the MCS/repetition (the same with the DL-MAP messages) is known by MS 10, the slot number N containing this field may be computed by MS 10 (M is the number of groups whose corresponding indication bits are set in the wakeup bitmap in the wakeup_indication field.)

When flag=11, three SLPIDs are listed in the first 30 bits of the wakeup_indication field.

The PHY resource allocation for the wakeup_indication field has at least two embodiments.

Figure 4:
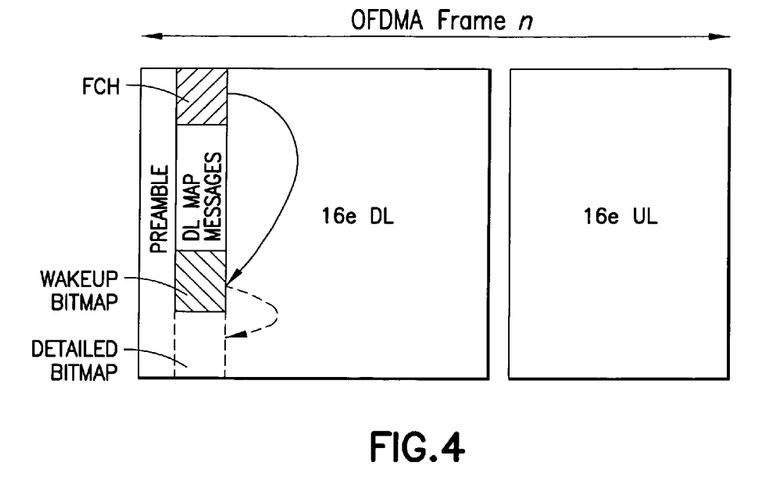
FIG. 4 shows a first example of a location of the wakeup_indication and wakeup bitmap fields shown in FIGS. 2 and 3.

In a first embodiment the wakeup_indication field is located immediately after the end of the DL-MAP, as shown in FIG. 4. In this case the MS 10 can start to decode the MAP-message in the next frame, and backwards compatibility in terms of DL-MAP location is maintained.

Figure 5:
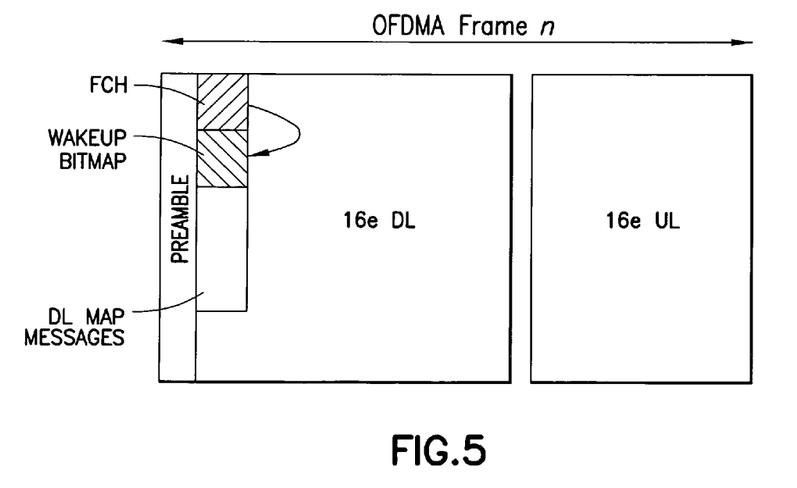
FIG. 5 shows a second example of the location of the wakeup_indication and wakeup bitmap fields shown in FIGS. 2 and 3.

In a second embodiment the wakeup_indication field is located immediately after the FCH, and before the start of the DL-MAP, as shown in FIG. 5. In this case the MS 10 may start to decode the MAP-message in the same frame as the wakeup_indication field. Though backwards compatibility is not provided in terms of the DL-MAP location, the DL-MAP is still begun in a fixed location (e.g., after the FCH and wakeup_indication field, the lengths of which are constant). As a result, there is no problem presented for MSs 10 to decode the DL-MAP, without decoding the wakeup_indication field. Note that in this option there is no detailed bitmap field, which implies that the flag bits in FCH are not set "10".

Figure 6:
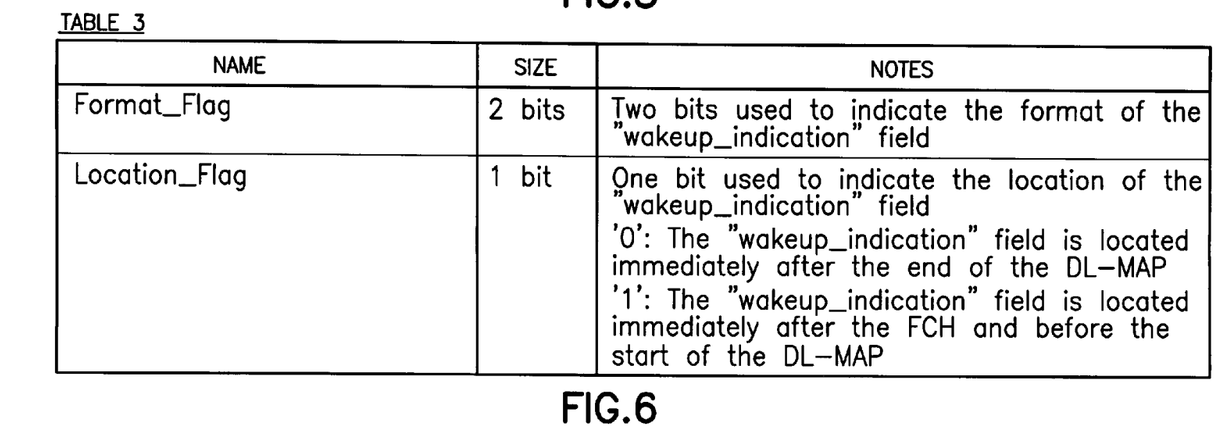
FIG. 6 illustrates a Table (Table 3) showing an exemplary flag bits definition in a FCH.

It is within the scope of these exemplary embodiments to use an additional (currently reserved) RSV bit in FCH to indicate the location of the wakeup bitmap. The meaning of these bits are summarized Table 3 (FIG. 6) for clarification.

Various embodiments in terms of the location of the wakeup_indication field and synchronization methods were described above. Two particularly attractive embodiments are a fully backwards compatible embodiment, where the wakeup_indication field is located immediately after the end of the DL-MAP, where the MS 10 obtains synchronization by decoding DL-MAP; and a more efficient, but not fully backwards compatible embodiment, where the wakeup_indication field is located immediately after the FCH and before the start of the DL-MAP, and where all related common fields are moved out of the MAP message (and into the PHY field) for synchronization.

One significant advantage that is obtained by the use of these exemplary embodiments is that the if the BS 12 knows that the MS 10 need not be receiving (and decoding) during the listening window, the MS 10 need not consume power to decode irrelevant messages. Note that the DL-MAP/UL-MAP usually is much longer than the PHY field in accordance with this invention, and thus the decoding/demodulation power consumption during the listening window can be significantly reduced.

Based on the foregoing it should be apparent that the exemplary embodiments of this invention provide a method, apparatus and computer program product(s) to enhance the power saving operation of a MS.

Figure 7:
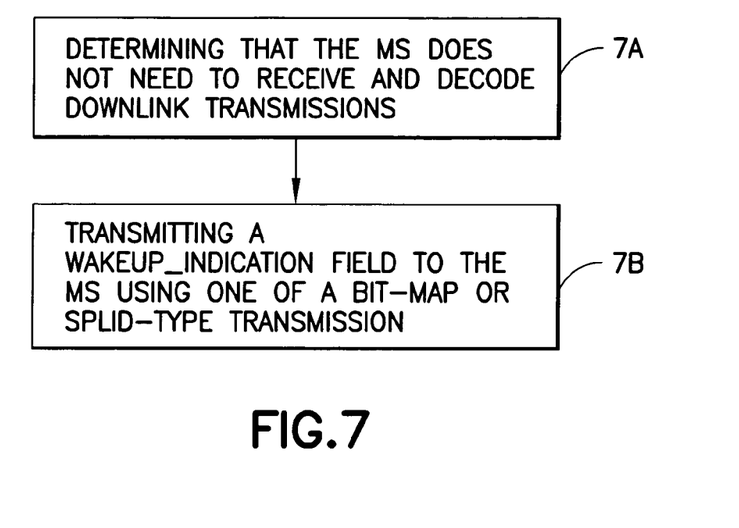
FIG. 7 is a logic flow diagram showing a method, and execution of a computer program at the BS, in accordance with exemplary embodiments of this invention.

(A) In accordance with a method, and referring to FIG. 7, at Block 7A the BS determines that the MS does not need to receive and decode downlink transmissions; and at Block 7B the BS transmits a wakeup_indication field to the MS using one of a bit-map or SLPID-type transmission.

(B) In the method of the preceding paragraph, where in the bit-map type transmission a first wakeup bit-map is transmitted in the wakeup_indication field and corresponds to 32 groups, and a second bit-map (defined either in a PHY field after the wakeup_indication field, or as a MAC message) corresponds to groups having indication bits set in the first wakeup bit-map, and indicates which MSs in the group are to decode DL-MAP messages in following frames in a listening window.

(C) In the method of paragraph (A) where in the bit-map type transmission a first wakeup bit-map is transmitted in BCH or in SFH, and a second bit-map (defined either in a PHY field after the wakeup_indication field, or as a MAC message) corresponds to groups having indication bits set in the first wakeup bit-map, and indicates which MSs in the group are to decode DL-MAP messages in following frames in a listening window.

(D) In the method of paragraph (A), where in the SLPID-type transmission where at least one SLPID is indicated in the wakeup_indication field and corresponding MSs in response begin to decode DL-MAP messages, where the existence of the wakeup_indication field is indicated by certain bits in the FCH.

(E) In the method of the preceding paragraphs, further comprising placing related fields: PHY synchronization fields, Operation ID, Sector ID before the wakeup_indication field, enabling the MS to obtain synchronization with the BS.

(F) In the method of the preceding paragraphs, further comprising selectively setting a plurality of flag bits in FCH, such that when flag=00, the method is not used in a current frame; when flag=01, those MSs belonging to groups whose corresponding bit in the wakeup bitmap are set begin to decode a MAC message in the same frame to determine the detailed wakeup bitmap of each group; when flag=10, those MSs belonging to groups whose corresponding bit in the wakeup bit-map are set begin to decode another PHY field immediately after the wakeup_indication field in the same frame to determine the detailed wakeup bitmap of each group, and when flag=11, a plurality of SLPIDs are listed in the wakeup_indication field.

(G) The method of paragraph (A), where the wakeup_indication field is located immediately after the end of a DL-MAP, or is located immediately after the FCH and before the start of the DL-MAP.

Figure 8:
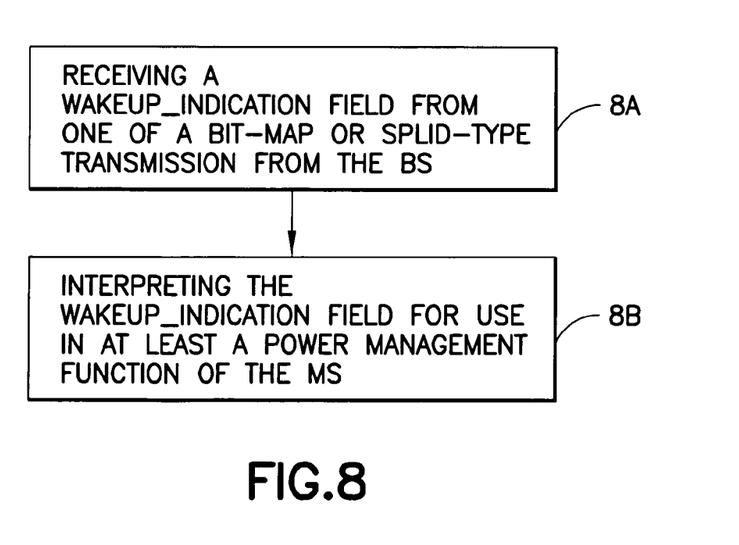
FIG. 8 is a logic flow diagram showing a method, and execution of a computer program at the MS, in accordance with exemplary embodiments of this invention.

(H) In accordance with another method, and referring to FIG. 8, at Block 8A the MS receives a wakeup_indication field from one of a bit-map or SLPID-type transmission from the BS, and at Block 8B the MS interprets the wakeup_indication field for use in at least a power management function of the MS.

(I) In the method of the preceding paragraph, where in the bit-map type transmission a first wakeup bit-map is transmitted in the wakeup_indication field and corresponds to 32 groups, and a second bit-map (defined either in a PHY field after the wakeup_indication field, or as a MAC message) corresponds to groups having indication bits set in the first wakeup bit-map, and indicates which MSs in the group are to decode DL-MAP messages in following frames in a listening window.

(J) In the method of paragraph (H), where in the bit-map type transmission a first wakeup bit-map is transmitted in BCH or in SFH, and a second bit-map (defined either in a PHY field after the wakeup_indication field, or as a MAC message) corresponds to groups having indication bits set in the first wakeup bit-map, and indicates which MSs in the group are to decode DL-MAP messages in following frames in a listening window.

(K) In the method of paragraph (H), where in the SLPID-type transmission where at least one SLPID is indicated in the wakeup_indication field, and corresponding MSs in response begin to decode DL-MAP messages, where the existence of the wakeup_indication field is indicated by certain bits in the FCH.

(L) In the method of the preceding paragraphs, further comprising receiving related fields: PHY synchronization fields, Operation ID, Sector ID before the wakeup_indication field, enabling the MS to obtain synchronization with the BS.

(M) In the method of the preceding paragraphs, further comprising receiving a plurality of selectively set flag bits in the FCH, such that when flag=00, the method is not used in a current frame; when flag=01, those MSs belonging to groups whose corresponding bit in the wakeup bitmap are set begin to decode a MAC message in the same frame to determine the detailed wakeup bitmap of each group; when flag=10, those MSs belonging to groups whose corresponding bit in the wakeup bit-map are set begin to decode another PHY field immediately after the wakeup_indication field in the same frame to determine the detailed wakeup bitmap of each group, and when flag=11, a plurality of SLPIDs are listed in the wakeup_indication field.

(N) The method of paragraph (H), where the wakeup_indication field is located immediately after the end of a DL-MAP, or is located immediately after the FCH and before the start of the DL-MAP.

The various blocks shown in FIGS. 7 and 8 may be viewed as method steps, and/or as operations that result from operation of computer program code, and/or as a plurality of coupled logic circuit elements constructed to carry out the associated function(s). Thus, the exemplary embodiments of this invention also pertain to apparatus that is constructed and operated so as to accomplish these various method steps at both the BS 12 and the MS 10.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the IEEE 802.16-type system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
receiving at a user equipment an indication from a base station in a physical layer field; and
interpreting the indication for use in at least a power management function;
wherein the physical layer field comprises a bit-map, and the indication comprises a first wakeup bit-map in a superframe header and is followed by a second bit-map, wherein the second bit-map is defined as a medium access control layer message, the second bit-map corresponds to groups having the indication bits set in the first wakeup bit-map, and in response to being a member of the group, decoding downlink map messages in following frames in a listening window.

2. A method, comprising:
receiving at a user equipment an indication from a base station in a physical layer field;
interpreting the indication for use in at least a power management function, wherein the physical layer field comprises a bit-map, and the indication comprises a first wakeup bit-map in a superframe header and is followed by a second bit-map, where the second bit-map is defined as a medium access control layer message, said second bit-map corresponds to groups having the indication bits set in the first wakeup bit-map, and in response to being a member of the group, decoding downlink map messages in following frames in a listening window;
receiving at the user equipment a plurality of selectively set flag bits in a frame control header, where the flag bits are defined as a flag;

in response to the flag=01 and being a member of the group whose bits are set, decoding a medium access control layer message in the same frame to determine a detailed wakeup bitmap;

in response to the flag=10 and being a member of the group whose bits are set, decoding another physical layer field immediately after the indication in the same frame to determine a detailed wakeup bitmap; and in response to the flag=11, listing a plurality of sleeping identifications in the indication.

3. A method, comprising:

receiving at a user equipment an indication from a base station in a physical layer field, the indication being located immediately after the end of a downlink map; and interpreting the indication for use in at least a power management function;

wherein the physical layer field comprises a bit-map, and the indication comprises a first wakeup bit-map in a superframe header and is followed by a second bit-map, where the second bit-map is defined as a medium access control layer message, said second bit-map corresponds to groups having the indication bits set in the first wakeup bit-map, and in response to being a member of the group, decoding downlink map messages in following frames in a listening window.

4. A method comprising:

determining that a mobile station does not need to receive and decode a downlink transmission; and transmitting from a network node an indication to the mobile station, where the indication is transmitted in a physical layer field;

wherein the physical layer field comprises a bit-map, and the indication comprises a first wakeup bit-map in a superframe header and is followed by a second bit-map, where the second bit-map is defined as a medium access control layer message, said second bit-map corresponds to groups having the indication bits set in the first wakeup bit-map, and in response to being a member of the group, decoding downlink map messages in following frames in a listening window.

5. A method comprising:

determining that a mobile station does not need to receive and decode a downlink transmission; and transmitting from a network node an indication to the mobile station, wherein the indication is transmitted in a physical layer field, where the physical layer field comprises a bit-map, and the indication comprises a first wakeup bit-map in a superframe header and is followed by a second bit-map, where the second bit-map is defined as a medium access control layer message, said second bit-map corresponds to groups having the indication bits set in the first wakeup bit-map, and in response to being a member of the group, decoding downlink map messages in following frames in a listening window;

selectively setting a plurality of flag bits in a frame control header, where the flag bits are defined as a flag;

in response to the flag=01 and being a member of the group whose bits are set, decoding a medium access control layer message in the same frame to determine a detailed wakeup bitmap;

in response to the flag=10 and being a member of the group whose bits are set, decoding another physical layer field immediately after the indication in the same frame to determine a detailed wakeup bitmap; and in response to the flag=11, listing a plurality of sleeping identifications in the indication.

6. A method comprising:

determining that a mobile station does not need to receive and decode a downlink transmission; and transmitting from a network node an indication to the mobile station, where the indication is transmitted in a physical layer field and is located immediately after the end of a downlink map;

wherein the physical layer field comprises a bit-map, and the indication comprises a first wakeup bit-map in a superframe header and is followed by a second bit-map, where the second bit-map is defined as a medium access control layer message, said second bit-map corresponds to groups having the indication bits set in the first wakeup bit-map, and in response to being a member of the group, decoding downlink map messages in following frames in a listening window.

7. A non-transitory computer readable memory in which is stored a computer program executable by a processor to perform actions comprising:

receiving an indication from a base station in a physical layer field; and interpreting the indication for use in at least a power management function;

wherein the physical layer field comprises a bit-map, and the indication comprises a first wakeup bit-map in a superframe header and is followed by a second bit-map, where the second bit-map is defined as a medium access control layer message, said second bit-map corresponds to groups having the indication bits set in the first wakeup bit-map, and in response to being a member of the group, decoding downlink map messages in following frames in a listening window.

8. A non-transitory computer readable memory in which is stored a computer program executable by a processor to perform actions comprising:

receiving an indication from a base station in a physical layer field; and interpreting the indication for use in at least a power management function;

wherein the physical layer field comprises a bit-map, and the indication comprises a first wakeup bit-map in a superframe header and is followed by a second bit-map, where the second bit-map is defined as a medium access control layer message, said second bit-map corresponds to groups having the indication bits set in the first wakeup bit-map, and in response to being a member of the group, decoding downlink map messages in following frames in a listening window;

receiving a plurality of selectively set flag bits in a frame control header, where the flag bits are defined as a flag;

in response to the flag=01 and being a member of the group whose bits are set, decoding a medium access control layer message in the same frame to determine a detailed wakeup bitmap;

in response to the flag=10 and being a member of the group whose bits are set, decoding another physical layer field immediately after the indication in the same frame to determine a detailed wakeup bitmap; and in response to the flag=11, listing a plurality of sleeping identifications in the indication.

9. A non-transitory computer readable memory in which is stored a computer program executable by a processor to perform actions comprising:

receiving an indication from a base station in a physical layer field, the indication being located immediately after the end of a downlink map; and interpreting the indication for use in at least a power management function;

wherein the physical layer field comprises a bit-map, and the indication comprises a first wakeup bit-map in a superframe header and is followed by a second bit-map, where the second bit-map is defined as a medium access control layer message, said second bit-map corresponds to groups having the indication bits set in the first wakeup bit-map, and in response to being a member of the group, decoding downlink map messages in following frames in a listening window.

10. A non-transitory computer readable memory in which is stored a computer program executable by a processor to perform actions comprising:

determining that a mobile station does not need to receive and decode a downlink transmission; and transmitting an indication to the mobile station, where the indication is transmitted from a physical layer field;

wherein the physical layer field comprises a bit-map, and the indication comprises a first wakeup bit-map in a superframe header and is followed by a second bit-map, where the second bit-map is defined as a medium access control layer message, said second bit-map corresponds to groups having the indication bits set in the first wakeup bit-map, and in response to being a member of the group, decoding downlink map messages in following frames in a listening window.

11. A non-transitory computer readable memory in which is stored a computer program executable by a processor to perform actions comprising:

determining that a mobile station does not need to receive and decode a downlink transmission;

transmitting an indication to the mobile station, where the indication is transmitted from a physical layer field;

wherein the physical layer field comprises a bit-map, and the indication comprises a first wakeup bit-map in a superframe header and is followed by a second bit-map, where the second bit-map is defined as a medium access control layer message, said second bit-map corresponds to groups having the indication bits set in the first wakeup bit-map, and in response to being a member of the group, decoding downlink map messages in following frames in a listening window;

selectively setting a plurality of flag bits in a frame control header, where the flag bits are defined as a flag;

in response to the flag=01 and being a member of the group whose bits are set, decoding a medium access control layer message in the same frame to determine a detailed wakeup bitmap;

in response to the flag=10 and being a member of the group whose bits are set, decoding another physical layer field immediately after the indication in the same frame to determine a detailed wakeup bitmap; and in response to the flag=11, listing a plurality of sleeping identifications in the indication.

12. A non-transitory computer readable memory in which is stored a computer program executable by a processor to perform actions comprising:

determining that a mobile station does not need to receive and decode a downlink transmission; and transmitting an indication to the mobile station, where the indication is transmitted from a physical layer field and is located immediately after the end of a downlink map;

wherein the physical layer field comprises a bit-map, and the indication comprises a first wakeup bit-map in a superframe header and is followed by a second bit-map, where the second bit-map is defined as a medium access control layer message, said second bit-map corresponds to groups having the indication bits set in the first wakeup bit-map, and in response to being a member of the group, decoding downlink map messages in following frames in a listening window.

13. An apparatus comprising:

a receiver configured to receive an indication from a base station in a physical layer field; and a controller configured to interpret the wakeup-indication field for use in at least a power management function;

wherein the physical layer field comprises a bit-map, and the indication comprises a first wakeup bit-map in a superframe header and is followed by a second bit-map, where the second bit-map is defined as a medium access control layer message, said second bit-map corresponds to groups having the indication bits set in the first wakeup bit-map, and in response to being a member of the group, decoding downlink map messages in following frames in a listening window.

14. An apparatus comprising:

a receiver configured to receive an indication from a base station in a physical layer field; and a controller configured to interpret the wakeup-indication field for use in at least a power management function;

wherein the physical layer field comprises a bit-map, and the indication comprises a first wakeup bit-map in a superframe header and is followed by a second bit-map, where the second bit-map is defined as a medium access control layer message, said second bit-map corresponds to groups having the indication bits set in the first wakeup bit-map, and in response to being a member of the group, decoding downlink map messages in following frames in a listening window; and where the receiver is further configure to receive a plurality of selectively set flag bits in a frame control header, where the flag bits are defined as a flag;

in response to the flag=01 and being a member of the group whose bits are set, the controller is further configured to decode a medium access control layer message in the same frame to determine a detailed wakeup bitmap;

in response to the flag=10 and being a member of the group whose bits are set, the controller is further configured to decode another physical layer field immediately after the indication in the same frame to determine a detailed wakeup bitmap; and in response to the flag=11, the controller is further configured to list a plurality of sleeping identifications in the indication.

15. An apparatus comprising:

a receiver configured to receive an indication from a base station in a physical layer field, the indication being located immediately after the end of a downlink map, or located immediately after a frame control header and before the start of a downlink map; and a controller configured to interpret the wakeup-indication field for use in at least a power management function;

wherein the physical layer field comprises a bit-map, and the indication comprises a first wakeup bit-map in a superframe header and is followed by a second bit-map, where the second bit-map is defined as a medium access control layer message, said second bit-map corresponds to groups having the indication bits set in the first wakeup bit-map, and in response to being a member of the group, decoding downlink map messages in following frames in a listening window.

16. An apparatus comprising:
a controller configured to determine that a mobile station does not need to receive and decode a downlink transmission; and
a transmitter configured to send an indication to the mobile station, where the indication is transmitted in a physical layer field;
wherein the physical layer field comprises a bit-map, and the indication comprises a first wakeup bit-map in a superframe header and is followed by a second bit-map, where the second bit-map is defined as a medium access control layer message, said second bit-map corresponds to groups having the indication bits set in the first wakeup bit-map, and in response to being a member of the group, decoding downlink map messages in following frames in a listening window.

17. An apparatus comprising:
a controller configured to determine that a mobile station does not need to receive and decode a downlink transmission; and
a transmitter configured to send an indication to the mobile station, where the indication is transmitted in a physical layer field;
wherein the physical layer field comprises a bit-map, and the indication comprises a first wakeup bit-map in a superframe header and is followed by a second bit-map, where the second bit-map is defined as a medium access control layer message, said second bit-map corresponds to groups having the indication bits set in the first wakeup bit-map, and in response to being a member of the group, decoding downlink map messages in following frames in a listening window;
and wherein the controller is further configured to selectively set a plurality of flag bits in a frame control header, where the flag bits are defined as a flag;
in response to the flag=01 and being a member of the group whose bits are set, the controller is further configured to decode a medium access control layer message in the same frame to determine a detailed wakeup bitmap;
in response to the flag=10 and being a member of the group whose bits are set, the controller is further configured to decode another physical layer field immediately after the indication in the same frame to determine a detailed wakeup bitmap; and
in response to the flag=11, the controller is further configured to list plurality of sleeping identifications in the indication.

18. An apparatus comprising:
a controller configured to determine that a mobile station does not need to receive and decode a downlink transmission; and
a transmitter configured to send an indication to the mobile station, where the indication is transmitted in a physical layer field and is located immediately after the end of a downlink map;
wherein the physical layer field comprises a bit-map, and the indication comprises a first wakeup bit-map in a superframe header and is followed by a second bit-map, where the second bit-map is defined as a medium access control layer message, said second bit-map corresponds to groups having the indication bits set in the first wakeup bit-map, and in response to being a member of the group, decoding downlink map messages in following frames in a listening window.

19. The method as in claim 1, wherein the physical field comprises a sleeping identification and the indication comprises at least one bit in a frame control header and at least one sleeping identification; and
in response to having corresponding sleeping identification, decoding downlink map messages.

20. The method as in claim 19, further comprising receiving physical layer synchronization fields, operating identification, and sector identification prior to receiving the identification to enable synchronization with the base station.

21. The method as in claim 1, wherein the first wakeup bit-map corresponds to a number of groups.

22. The method as in claim 2, wherein the first wakeup bit-map corresponds to a number of groups.

23. The method as in claim 3, wherein the first wakeup bit-map corresponds to a number of groups.

24. The method as in claim 4, wherein the first wakeup bit-map corresponds to a number of groups.

* * * * *